UNITED STATES PATENT OFFICE.

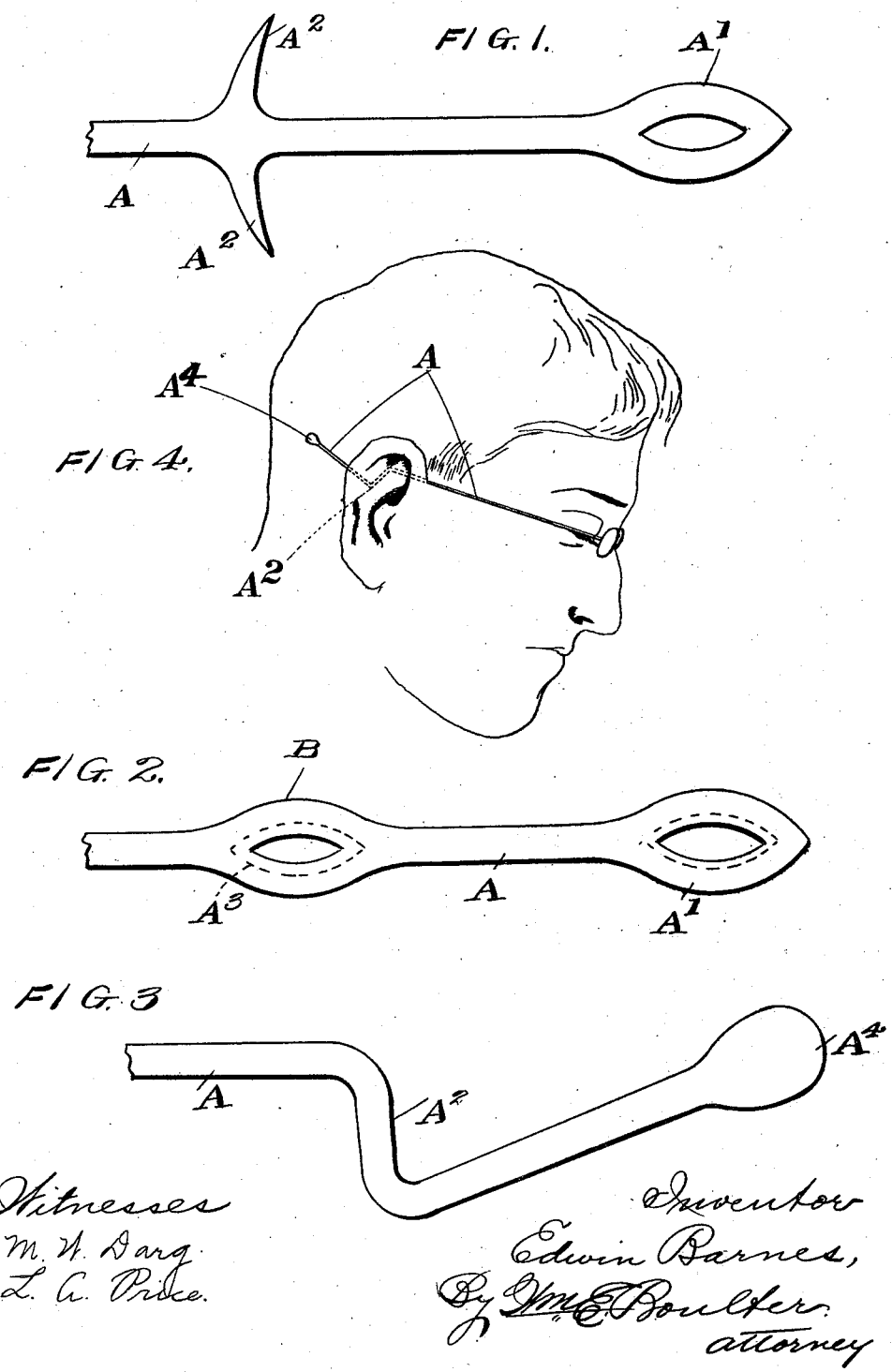

EDWIN BARNES, OF SHEFFIELD, ENGLAND.

SPECTACLE-TEMPLE.

1,001,238. Specification of Letters Patent. Patented Aug. 22, 1911.

Application filed August 13, 1906. Serial No. 330,492.

*To all whom it may concern:*

Be it known that I, EDWIN BARNES, a subject of the King of England, residing in Sheffield, Yorkshire, in England, have invented certain new and useful Improvements in or Relating to Straight - Side Spectacle-Temples, (for which I have made application for Letters Patent in Great Britain under No. 18,834, dated September 19, 1905,) of which the following is a specification.

This invention relates to straight side spectacles and the like, its object being to provide a construction which will be firmly held on the wearer's head and may be easily placed in position.

As is well-known straight side spectacles are those in which the sides are formed of springy material and are held in place by pressure exerted against the head by the said spring sides, this form being preferable, where it can be worn, to the hook side construction (in which the sides are provided with a hook or bend at their free ends adapted to pass around the ears of the wearer) on account of there being no harmful pressure at the back of the ears and owing to the greater ease with which they are placed on or removed from the head. As heretofore made, straight or spring side spectacles have been liable to slip out of position, especially when the wearer lowers his head, but, according to the present invention, this liability is removed by enlarging the virtual bearing surface of the spring side against the head by increasing the number of points of contact, effected by providing an addition in the form of a rigid integral projection of the spring side situated on one or both sides between the end thereof and the spectacle frame, and designed so as to be behind the ear of the wearer, though not necessarily in contact therewith. It has been found that such means cause no discomfort to the wearer and result in the spectacles being so firmly held in position that they will not be dislodged even by movements which would easily shift an ordinary straight or spring side pair of spectacles.

It is to be understood that the integral addition or projection according to this invention is so disposed on the spectacle side and the length of the latter is such that when the spectacles are in use the addition is situated behind the ear of the wearer and the spectacle side extends still farther beyond the ear. This situation of the addition is an important feature of the present invention, for while the provision of such an addition upon any part of the spectacle side would doubtless partially act in the manner in which it is employed in this invention (*i. e.* to hold a straight or spring side pair of spectacles more securely in position by increasing the bearing surface between the spectacle side and the head) yet if the addition were disposed between the wearer's ear and the spectacle frame, the tendency would be for the free extremities of the spectacle sides to be forced away from the wearer's head and thus be rendered inoperative, reducing the construction to the equivalent of short sided spectacles in which the sides extended no farther than the position of the addition, somewhere between the eyes and the ears of the wearer. Such a construction possesses inherent disadvantages which are not apparent in spectacles according to this invention, among the chief of which may be mentioned the absence of any support to prevent the ends of the sides slipping downward, and the tendency for the spectacle frame to be bent at the bridge in such a manner that the ends of the frame (where the sides are hinged) are forced outward away from the wearer's face. The result of each of these two disadvantages will be to produce a prismatic effect in a different direction, and it is one of the objects of the present invention to avoid these very harmful prismatic effects.

By forming the addition according to the present invention in such a position that it is situated behind the ear of the wearer at some distance from the end of the side neither of the above mentioned disadvantages will be present but the spectacles will be more securely held in position, without distorting the lens frame, not only by increasing the bearing surface between the spectacle sides and the wearer's head and by the spring pressure of the free end of the side beyond the addition but also by utilizing the ear to prevent the sides from falling downward or the spectacles from jerking forward, so that a spectacle side according to this invention may be described as a combination of a straight or spring side and a hook side in which the hook part is not normally in action on a hook on the ear but is present ready to counteract any abnormal tendency for the spectacles to be jerked forward.

In the accompanying drawings:—Figure 1 is an enlarged elevation of a spectacle spring side according to this invention and Figs. 2 and 3 are similar views each showing a modification. Fig. 4 is a view illustrating a pair of spectacles according to this invention *in situ* on the head of a wearer.

Like letters indicate like parts throughout the drawings.

In carrying out this invention the spectacle side A is made more or less straight, with the requisite amount of "spring" in it, $A^1$ being its free end. The hinge and remainder of the frame form no part of the present invention and are not illustrated in Figs. 1, 2 and 3. An addition in the form of a rigid integral projection $A^2$ is formed on the side A in such a position that when in use it is situated behind the ear of the wearer, the end $A^1$ extending beyond such projection. Two or more of such projections may be provided and they may be situated either above or below the side, or in both these positions, either opposite one another as shown or side by side or otherwise arranged as desired.

Fig. 2 illustrates a modification in the shape of the projection $A^2$, which in this case is made hollow as shown at B. It may carry a pad $A^3$ (indicated by dotted lines) of any suitable material within its hollow, and if desired this pad may be pneumatic. Similarly a pad (also indicated by dotted lines) may be carried at the extreme end $A^1$ of the side A.

In the modification illustrated in Fig. 3, only the lower projection $A^2$ (of the two shown in Fig. 1) is employed and the free ended extension of the spectacle side beyond the projection is not continuous with the main part A, thereof, but extends from a portion of the projection $A^2$ somewhat removed from the main part A of the side. The extremity $A^4$ of this free ended extension (shown of a slightly different form from that illustrated in Figs. 1 and 2) is preferably in such a position that it would be intersected by a continuation of the main part A of the side.

Fig. 4 illustrates this invention in use, as exemplified in the modification shown in Fig. 3. The part $A^2$ is situated behind the ear and prevents the spectacles from slipping forward. The spectacle side A extends beyond $A^2$ as far as $A^1$ and the whole of this extension as well as the addition $A^2$ is pressed against the head by the pressure exerted by the spring side, thereby securely holding the spectacles in place.

The shape of the integral projection may vary within wide limits so long as it is situated behind the ear of the wearer, between the ear and the end of the side.

What I claim and desire to secure by Letters Patent is:—

1. The combination of a spectacle spring side, a rigid integral projection thereon adapted to be situated behind the ear of the wearer and a free ended extension of the spectacle side beyond the projection both the projection and the extension being pressed into contact with the wearer's head by the pressure exerted by the spring side substantially as and for the purpose set forth.

2. The combination of a spectacle spring side, a rigid integral projection $A^2$ thereon adapted to be situated behind the ear of the wearer, a free ended extension of the spectacle side beyond the projection and a pad carried by the projection both the projection and the extension being pressed into contact with the wearer's head by the pressure exerted by the spring side substantially as and for the purpose set forth.

3. The combination of a spectacle spring side, a rigid integral projection $A^2$ thereon adapted to be situated behind the ear of the wearer, a free ended extension of the spectacle side beyond the projection, a pad carried by the projection and a pad near the free end of the extension, both the projection and the extension being pressed into contact with the wearer's head by the pressure exerted by the spring side substantially as and for the purpose set forth.

In testimony whereof I have signed my name to this specification in the presence of two subscribing witnesses.

EDWIN BARNES.

Witnesses:
 ARTHUR H. GREENWOOD,
 CHAS. N. DANIELS.